United States Patent [19]

Shimada et al.

[11] Patent Number: 4,575,772

[45] Date of Patent: Mar. 11, 1986

[54] APPARATUS FOR RECORDING ADDITIONAL VIDEO SIGNALS IN A HELICAL SCAN OPERATION

[75] Inventors: Keiichiro Shimada; Takao Takahashi; Hisayoshi Moriwaki; Kenji Nakano, all of Kanagawa, Japan

[73] Assignee: Sony Corporation, Tokyo, Japan

[21] Appl. No.: 478,491

[22] Filed: Mar. 24, 1983

[30] Foreign Application Priority Data

Mar. 25, 1982 [JP] Japan ................................ 57-48019

[51] Int. Cl.⁴ ........................ H04N 7/00; H04N 5/91; G11B 5/09

[52] U.S. Cl. .................................. 360/19.1; 358/343; 358/335; 360/18; 360/33.1

[58] Field of Search ............... 358/341, 343, 323, 335; 360/19.1, 9.1, 11.1, 27, 18, 33.1; 369/48, 49

[56] References Cited

U.S. PATENT DOCUMENTS 4,353,098 10/1982 Heinz et al. .......................... 360/9.1

4,418,364 11/1983 Wine .............................. 358/335 X 4,423,444 12/1983 Humphreys .......................... 360/79

FOREIGN PATENT DOCUMENTS 0026791 2/1980 Japan .................................... 360/79

*Primary Examiner*—Raymond F. Cardillo
*Assistant Examiner*—Robert A. Weinhardt
*Attorney, Agent, or Firm*—Lewis H. Eslinger; Alvin Sinderbrand

[57] ABSTRACT

A video signal recording apparatus of the type that records a coded audio signal through time division relative to a video signal at one extended end of each of oblique tracks formed on a magnetic tape by helical scanning. The apparatus comprises a circuit for recording a coded video signal in the track region where a coded audio signal is recorded, and a circuit for recording identification data to discriminate between the coded audio signal and the coded video signal on the magnetic tape or recording control data thereon to control playback modes of the recorded signals.

11 Claims, 13 Drawing Figures

APPARATUS FOR RECORDING ADDITIONAL VIDEO SIGNALS IN A HELICAL SCAN OPERATION

BACKGROUND OF THE INVENTION

1. Field of the Invention

The present invention relates to a novel video signal recording apparatus so designed as to record a time-compressed, coded audio signal at one extended end of each of oblique tracks formed through helical scanning by means of a magnetic head mounted on a rotary drum. More particularly, it relates to a video signal recording apparatus adapted to record still picture signals as well as coded audio signals, and further to an apparatus capable of recording an identification (ID) signal indicative of a mode of recording both still picture signals and coded audio signals.

2. Description of the Prior Art

In the conventional video signal recording apparatus known heretofore, it has been customary to perform an audio-signal recording operation by means of a stationary head through amplitude modulation. Therefore, an audio track merely has a narrow frequency band where none of the video signals such as still picture signals is recordable. For this reason, when additionally recording video signals representative of characters and so forth including a title and explanation on a tape recorded previously by a video tape recorder, it has been general to erase the former video data by the technique of insert editing prior to recording the desired character video signals and so forth. According to such a method, however, it is impossible to superimpose the characters on the former video data unless dubbing is executed by the use of at least two video tape recorders (one for recording and one for playback). Furthermore, this process is technically complicated and disadvantageous in view of the picture quality that may be deteriorated.

SUMMARY OF THE INVENTION

The object of the present invention resides in providing an apparatus capable of simply superimposing characters and so forth in a recording mode. Normally, a coded audio track contains audio signals such as bilingual signals or stereo sound signals recorded thereon. And a video RAM (random access memory) is used in an operation of recording character video data on this audio track. Therefore, in such a recording operation, it becomes necessary to additionally record an identification (ID) signal so as to indicate the presence of the characters.

Accordingly, another object of the invention is to provide an apparatus further capable of recording an ID signal as well for discrimination between the character video signal and the audio signal.

DESCRIPTION OF THE PREFERRED EMBODIMENTS

Figure 1:
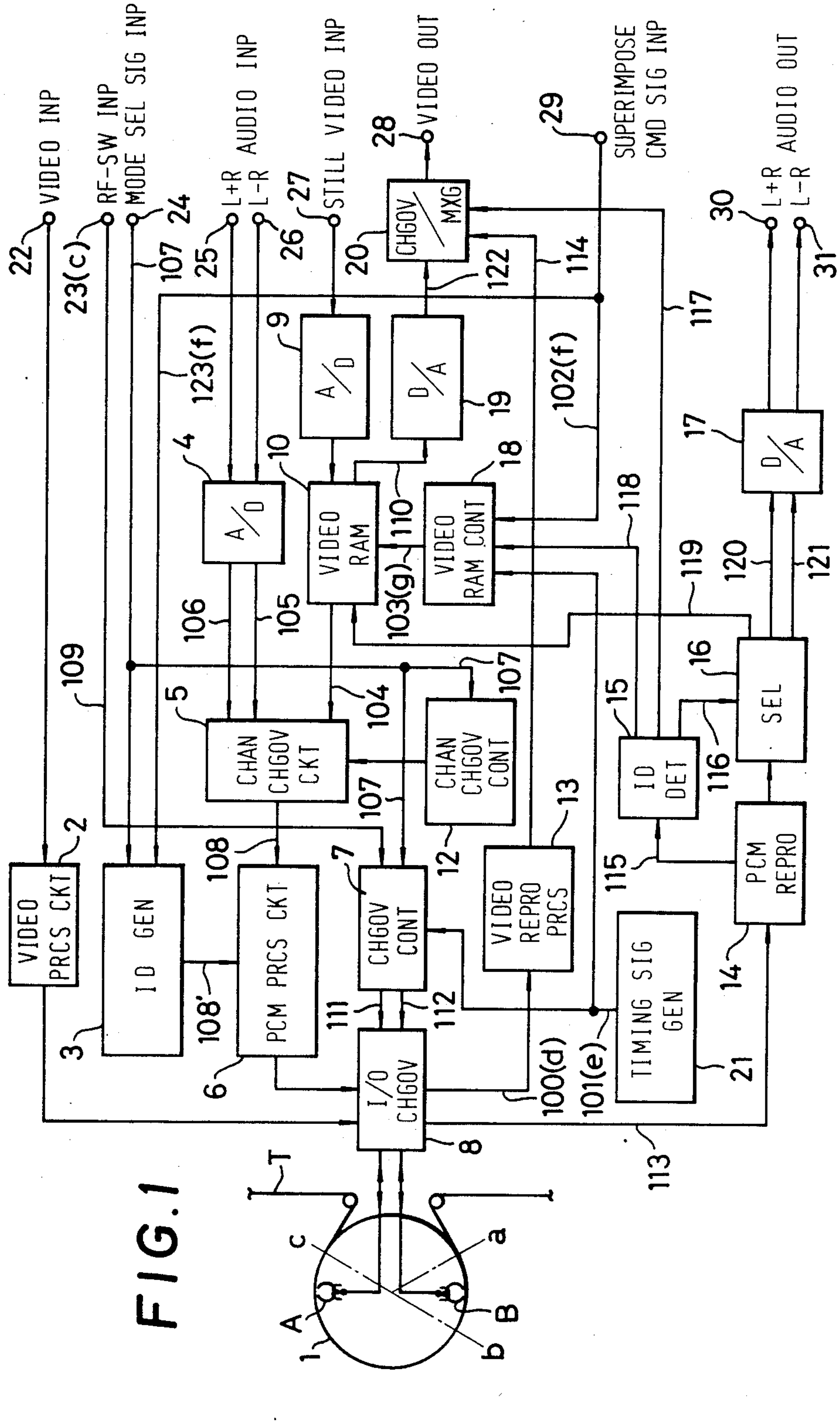
FIG. 1 is a block diagram of a video signal recording apparatus plotted for detailed explanation of the present invention.
Figure 2:
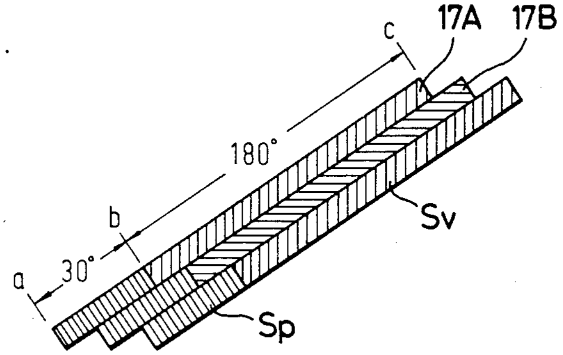
FIG. 2 shows a pattern of tracks recorded on a magnetic tape.

FIG. 1 is a block diagram of an exemplary apparatus embodying this invention, wherein a magnetic tape (T) is wound around a rotary drum (1) over an angle of about 210°, and oblique record tracks (17A, 17B) are formed alternately on the tape as illustrated in FIG. 2 by means of a pair of heads (A, B) disposed at an angular interval of 180° on the rotary drum (1). Out of the entire tape winding angle, a portion of about 30° (a—b) forms a coded audio signal recording region (Sp) shown in FIG. 2, and a portion of 180° (b—c) forms a video signal recording region (Sv), respectively. A video signal fed to a video input terminal (22) is applied via a video processing circuit (2) and a head input/output change-over circuit (8) to rotary magnetic heads (A, B). The input video signal thus applied is recorded on the video signal recording region (Sv) of the track shown in FIG. 2. A stereo sound signal or bilingual signal fed to audio input terminals (25, 26) is applied via an A/D converter (4), a channel change-over circuit 5, a PCM processing circuit (6) and the input/output change-over circuit (8) to the heads (A, B) and is thereby recorded on the coded audio signal recording region (Sp) of the track shown in FIG. 2. The PCM processing circuit (6) serves to add a correcting code, a data synchronizing signal and a PLL synchronizing signal for phase-locked loop, and further performs time compression, transformation to non-return-to-zero coding system, frequency modulation and addition of an ID signal (which will be described later). Such signal processing is executed by the known encoding techniques, so a detailed explanation is omitted here.

Figure 3:
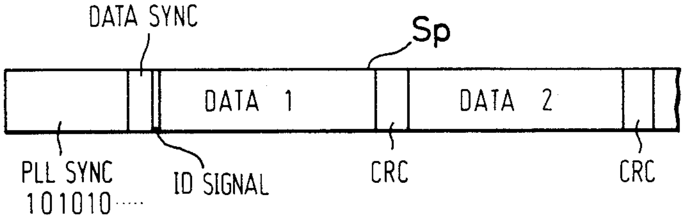
FIG. 3 illustrates a detailed signal array in the track region Sp shown in FIG. 2.

FIG. 3 shows a format of signal array in the coded audio signal recording region (Sp) of a track, wherein a PLL synchronizing signal is recorded to form a phase-locked loop for a generator which produces clock pulses for sampling the data. A data synchronizing signal indicates the beginning of a data signal, and an ID signal is recorded behind the data synchronizing signal. In the case of a stereo sound signal, for example, its left plus right (L+R) channel component is recorded in a track portion DATA 1 and its left minus right (L−R) channel component in another track portion DATA 2 respectively. When the input fed to the terminals (25, 26) is a bilingual signal, two languages are recorded in the track portions DATA 1 and DATA 2 respectively, and a cyclic redundancy code (CRC) is recorded behind each of DATA 1 and DATA 2.

Meanwhile, in a playback mode, the signals obtained from the heads (A, B) are separated into a video signal and a coded audio signal by the input/output change-over circuit (8). The video signal is reproduced by a video reproduction processing circuit (13) and then is fed to a change-over/mixing circuit (20) to be delivered from a video output terminal (28); while the coded audio signal is fed to a PCM reproducing circuit (14) and is sent via a selector (16) to a D/A converter (17), where the input is converted into an analog audio signal to be delivered from audio output terminals (30, 31). Ordinary recording and playback operations are performed in the manner described above.

In a particular recording mode of superimposing character video data on the tape thus recorded, the following steps are executed. In FIG. 1, a character video signal to be superimposed is fed through a still picture input terminal (27) and, after analog-to-digital conversion carried out by an A/D converter (9), the converted signal is stored in a video RAM (random access memory) (10). Subsequently, the video signal recorded previously on the tape is reproduced to be displayed on a monitor screen. Then the operator, watching the monitor screen, applies a command through a superimpose command input terminal (29) at a desired position for insertion of the character video signal. In response to this command, the digital character signal read out from the video RAM (10) is fed via the channel change-over circuit (5) to the PCM processing circuit (6), where the aforesaid processing is executed. The signal thus processed is further fed to the input/output change-over circuit (8) and is recorded in the audio track region (Sp) shown in FIG. 2. Since the audio track region (Sp) has a format of FIG. 3, the character video signal is recordable in either or both of its portions DATA 1 and DATA 2 by controlling the channel change-over circuit (5) to perform a predetermined operation. In this manner, it becomes possible to record the character video signal without affecting the video-recording track region (Sv) at all. When the character video signal has been recorded in one of the portions DATA 1 and DATA 2, the audio signal is reproducible without any impediment as it is left unerased in another portion.

Figures 5A, 5B, 5C, 5D, 5E, 5F, 5G, 5H, 5I:
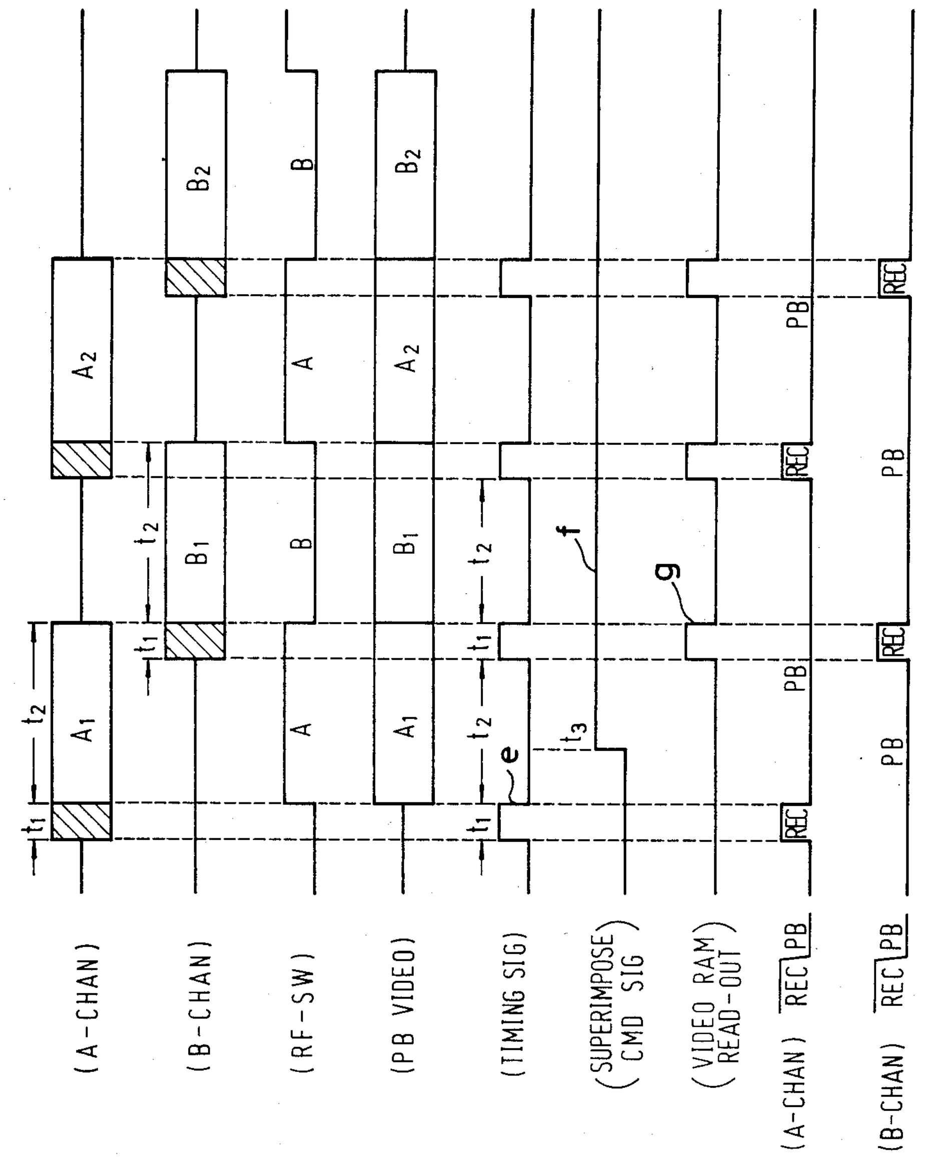
FIGS. 5A through 5I are timing charts showing signal waveforms for detailed explanation of the invention.

Now the timing to superimpose the character video signal will be described below with reference to FIGS. 1 and 5. FIG. 5A and 5B respectively show an audio signal (time t1) and a video signal (time t2) reproduced from the heads (A, B). Since a signal of FIG. 5C for switching the heads (A, B) is supplied from an RF switching input terminal (23) of FIG. 1 to control the input/output change-over circuit (8) via the change-over control circuit (7), merely the video signal of FIG. 5D is extracted to a line (100) out of the reproduced signals and, after being processed by the video reproduction processing circuit (13), the signal is forwarded via the change-over/mixing circuit (20) to the video output terminal (28) so as to be displayed on a monitor (not shown). A timing signal generator circuit (21) sends to a line (101) a timing signal e of FIG. 5E, which corresponds to a shaded area (t1) in FIGS. 5A and 5B.

A superimpose command f is supplied from a terminal (29) to a line (102) at time t3 of FIG. 5F and is fed to a video RAM control circuit (18) while being simultaneously fed via a line (123) to an ID signal generator circuit (3). Furthermore, the timing signal e is fed also to a video RAM control circuit (18), which then produces and sends a video RAM read-out signal g of FIG. 5G to an output line (103) thereof. Only during the high-level period of the read-out signal g, the video RAM (10) supplies its storage data via a line (104) to the channel change-over circuit (5), to which audio signals L+R and L−R are also fed via lines (105) and (106) respectively from the A/D converter (4). A mode select signal representative of a superimpose recording mode is fed from a terminal (24) via a line (107) to the channel change-over control circuit (12), so that the channel change-over circuit (5) selects the line (104) and sends the signal via a line (108) to the PCM processing circuit (6). In the meanwhile, the mode select signal is fed also to the ID generator circuit (3) via the line (107). This signal is composed of a plurality of bits, of which two are used in the present invention. Therefore, the following description will be given on the assumption that the mode select signal has a two-bit composition. When the bits of this signal are "11", for example, the channel change-over circuit (5) is controlled by the channel change-over control circuit (12) in such a manner as to feed via the line (108) merely the output signal of the video RAM (10) received via the line (104), so that the character video signal is recorded in both track portions DATA 1 and DATA 2 shown in FIG. 3. If the two bits of the mode select signal are "01", the output signal of the video RAM (10) received via the line (104) is recorded in DATA 1, while an audio signal such as L+R is recorded in DATA 2 behind analog-to-digital conversion executed by the A/D converter (4). In the case of "10", an audio signal L+R is recorded in DATA 1 and a signal L−R in DATA 2, respectively. Therefore, when the mode select signal has a bit pattern of "10", the character video signal, that is, the output of the video RAM (10) is not recorded. Suppose now that the mode select signal has a bit pattern of "11" and a character video signal is recorded in both track portions DATA 1 and DATA 2. It is to be noted here that, for recording a character video signal, the apparatus operation should be in a recording mode at the high level (time t1) of the timing signal e and in a playback mode at the low level (time t2) thereof. More particularly, regarding the recording/playback timing waveform of the head (A) shown in FIG. 5H, the head (A) is in a recording state during the high-level period of the signal and in a playback state during the low-level period; and regarding the recording/playback timing waveform of the head (B) shown in FIG. 5I, the head (B) is in a recording state during the high-level period of the signal and is in a playback state during the low-level period. The character video signal is processed in a predetermined manner by the PCM processing circuit (6), and simultaneously an ID signal "11" and a superimpose command are added by the ID generator circuit (3) behind to the data sync signal shown in FIG. 3, and then the signals thus combined are fed to the input/output change-over circuit (8). The change-over control circuit (7) receives a timing signal e of FIG. 5E via the line (101), an RF switching signal c of FIG. 5C via the line (109) from the terminal (23), and a mode select signal "11" via the line (107) respectively. The circuit (7) detects the signals applied via the lines (101, 109, 107) and sends output signals of FIGS. 5H and 5I to the input/output change-over circuit (8) via the lines (111) and (112) respectively, so that the character video signal is recorded in the track region Sp of FIG. 2 with the timing shown in FIGS. 5H and 5I. Although the ID signal is placed behind the data sync signal in the above embodiment, it may be recorded at any other position. For example, its position may be in front of or behind the PLL sync signal, or a recording pattern with respect to the data sync signal and the PLL sync signal may be altered as well.

Figure 4:
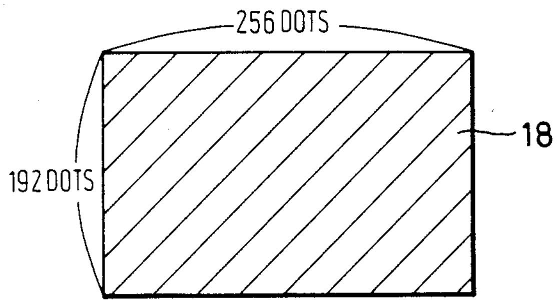
FIG. 4 illustrates an exemplary array of picture elements constituting still picture data.

The character video signal recorded in the above-described fashion may be composed of, for example, 192 vertical dots and 256 horizontal dots as illustrated in FIG. 4. It denotes that one picture consists of 49,152 picture elements. Ordinary character video data can be displayed in sufficient detail with such a large number of picture elements, wherein one bit is allocated to each dot so that a total of 49,152 bits are required to constitute a single picture. Each of the track portions DATA 1 and DATA 2 of FIG. 3 is so formed as to be capable of recording data of about 4000 bits. Therefore, when the character video signal is recorded in both track portions DATA 1 and DATA 2, it is possible to record about 8000 bits per field. Since 6,149 fields are needed to constitute a single picture on the basis of simple calculation, 7 fields are sufficient to cover one picture of character video data. In the state where the character video signal is recorded in DATA 1 and the audio signal is left unerased in DATA 2, it follows that one picture of character video data can be constituted of 14 fields. When it is desired to obtain a character video signal of 16-color chrominance data by allocating 4 bits to each dot, a total of 28 or 56 fields are sufficient to meet the requirement. Furthermore, by adding 8 bits to each dot as gray scale luminance data, it becomes possible to display a character picture of 16-color chrominance signal having 256 gradations. In this case, the required number of fields is 84 or 168. The character video signal recorded as mentioned above is reproduced in the following manner. Out of the playback signal obtained from the rotary heads (A, B), the video component of FIG. 5D alone is extracted to the line (100) with the input/output change-over circuit (8) being controlled by the change-over control circuit (7) and then is fed to the video reproduction processing circuit (13), so that the character video signal represented by the shaded area in each of FIGS. 5A and 5B is fed via the line (113) to the PCM reproducing circuit (14). The playback video signal processed in a predetermined way by the circuit (13) is subsequently fed via the line (114) to the change-over mixing circuit (20). Meanwhile, the character video signal fed to the PCM reproducing circuit (14) is so processed that its ID signal component is extracted therefrom and is sent via the line (115) to the ID detector circuit (15). Assuming now that a bit pattern of "11" is detected by the circuit (15), the ID signal "11" is fed as a control signal via the line (116) to the selector (16), so that no signal appears at the audio output lines (120, 121) of the selector (16). The character video signal is obtained on the output line (119) of the selector (16) at the timing of FIG. 5E and then is fed to the video RAM (10). The video RAM control circuit (18) receives the timing signal of FIG. 5E via the line (101) and also the ID signal "11" via the line (118), whereby the playback character video signal is stored in the video RAM (10) at the timing shown in FIGS. 5H and 5I. After storage of the character video data of one picture in the video RAM (10), the signal is fed therefrom via the line (110) to the D/A converter (19) where digital-to-analog conversion is executed. The character video signal thus converted into an analog form and the playback video signal are fed via the lines (122) and (114) respectively to the switching/mixing circuit (20), which then sends to the video output terminal (28) either the character video signal alone or a combination thereof with the playback video signal. Although not shown, the signal change-over and mixing actions are controlled by an external signal applied to control the circuit (20) and are also under control of the signal received via the output line (117) from the ID detector circuit (15). The control signal fed via the line (117) in a recording mode serves to hold the change-over/mixing circuit (20) in its "mixing" state for the same period of time as the duration of the superimpose command applied thereto.

Due to such control actions, merely a desired character video signal or a combination thereof with the video signal appear for a desired period of time at the video output terminal (28). In addition to the foregoing example where the character video signal is fed as an input from the terminal (27), generally the input may be still picture data as well and is not limited to such character video signal alone. According to the present invention, as described hereinabove, it becomes possible to additionally insert any of titles, subtitles, superimposed time indications, superimposed commercials, superimposed dialogues and still pictures by the technique of after-recording in a track region Sp formed for coded audio signal. Furthermore, on the basis of the identification signal recorded simultaneously, the character data or still picture can be reproduced together with the picture composed of the prerecorded video signals. And there exists another advantage that no deterioration is caused in the picture quality by after-recording.

What is claimed is:

1. Apparatus for recording additional video signals on a magnetic record medium having video and audio signals recorded thereon in oblique tracks by helical scanning, in which the recorded audio signals are arranged at an extended end of each of said oblique tracks, said apparatus comprising:

random access memory means for storing said additional video signals;

means for selectively reading out said additional video signals stored in said random access memory means;

recording means for recording said additional video signals selectively read out from said random access memory means on said magnetic record medium; and control means for controlling said recording means to record said additional video signals in positional correspondence with selected ones of said audio signals recorded at said extended ends of said tracks, whereby said additional video signals are recorded in place of said selected ones of said audio signals.

2. Apparatus according to claim 1, further comprising means for generating identification code signals fed to said recording means for recording on said magnetic record medium, whereby the signals recorded at said extended ends of said oblique tracks are identified.

3. Apparatus according to claim 1, wherein said additional video signals are still video signals.

4. Apparatus according to claim 1, wherein said additional video signals are character video signals.

5. Apparatus according to claim 1, in which said control means includes change-over switch means connected to said additional video signals stored in said random access memory means for selectively connecting said additional video signals to said recording means including magnetic recording heads for helically scanning said magnetic record medium.

6. Apparatus according to claim 5, in which said control means further includes timing generator means for controlling the operation of said change-over switch means for recording said additional video signals in positional correspondence with selected ones of said audio signals.

7. Apparatus according to claim 5, further comprising means connected to said change-over switch means for reproducing said recorded video and audio signals and said additional video signals from said magnetic record medium.

8. Apparatus for recording additional video signals onto a record medium on which there have been recorded video and audio signals in parallel oblique tracks by helical scanning, said apparatus comprising:

memory means connected to store additional video signals;

change-over means connected to additional video signals from said memory means for recording said additional video signals in said oblique tracks on said record medium;

control means connected to said memory means and to said change-over means for causing said additional video signals to be read out from said memory means to said change-over means;

identification signal generating means producing a coded identification signal identifying said additional video signals fed to said change-over means for recording on said record medium; and timing means connected to control said change-over means for recording said additional video signals and said coded identification signal on said record medium, whereby said additional video signals are recorded in said oblique tracks in positional correspondence with selected ones of said audio signals.

9. Apparatus according to claim 8, in which reproducing circuit means are connected to said change-over means for reproducing said recorded video and audio signals and said additional video signals from said recorded medium.

10. Apparatus according to claim 8, wherein said additional video signals are still video signals.

11. Apparatus according to claim 8, wherein said additional video signals are character video signals.

* * * * *